United States Patent [19]
Tum

[11] Patent Number: 5,119,764
[45] Date of Patent: Jun. 9, 1992

[54] FISH FEEDER WITH WATER FILTER AND HEATER

[76] Inventor: Chan-Lin Tum, 1st Fl; No. 68-4, Wan-An St; Mu-Cha District, Taipei, Taiwan

[21] Appl. No.: 663,668

[22] Filed: Mar. 4, 1991

[51] Int. Cl.$^5$ ............................................. A01K 5/00
[52] U.S. Cl. ................................................... 119/51.04
[58] Field of Search ..................... 119/5, 51.04, 51.01, 119/51.13, 51.14, 51.15, 52.1, 56.1

[56] References Cited

U.S. PATENT DOCUMENTS

| | | | |
|---|---|---|---|
| 3,994,807 | 11/1976 | Macklem | 119/5 |
| 4,094,788 | 6/1978 | Dockert | 119/5 X |
| 4,834,025 | 5/1989 | Tum | 119/51.04 X |

Primary Examiner—Gene Mancene
Assistant Examiner—Thomas Price
Attorney, Agent, or Firm—Young & Forward

[57] ABSTRACT

The present invention is mainly characterized by an automatic water flow circulation device and an automatic feeding stuffs supply device. The automatic water flow circulation device is provided with a motor-operated pump, a water-filtering trough, a water-purifying trough and a heating trough. The automatic feeding stuffs supply device is provided with a feeding stuffs container and a seesaw device, a water collector on one end of the seesaw device, and a rectangular plate on one end of the seesaw device, and a rectangular plate on the other end thereof. When the weight of water in the water collector exceeds the weight of the rectangular plate, the water collector will move downward to let the water flow into the aquarium, and the rectangular plate will also move upward to let the feeding stuffs fall into the aquarium at the same time so as to accomplish the automatic fish feeding operation.

2 Claims, 5 Drawing Sheets 5,119,764

FISH FEEDER WITH WATER FILTER AND HEATER

BACKGROUND OF THE INVENTION

Feeding an aquarium of lovely fish at home for appreciation not only promotes family harmony and happiness but also generates interest in the fish. Therefore, it goes without saying that a great number of families like it very much. So far as the equipment required for feeding fish at home is concerned, in addition to an aquarium, such equipment as a filter and a heating device are required to filter miscellaneous dirty substances in the aquarium and to keep a constant water temperature, so as to provide the fish with a comfortable growing environment that ensures the health and activity of fish therein. Undoubtedly, this is to show the master's concern about the fish. On the other hand, in order to ensure the health of the fish, it is the master's responsibility to feed the fish with a specific quantity of feeding stuffs as scheduled. However, sometimes the master cannot feed the fish as scheduled because of doing some job or leaving home for a number of days. Nowadays, there are a number of designs of automatic feeding devices which may be expected to solve the problem of feeding fish with a specific quantity of feeding stuffs as scheduled, but such automatic feeding device has only one function of automatic feeding, without maintaining the water clean and keeping the water temperature constant, so the master has to install such equipment as a filter and heating device in the aquarium to meet the requirement of feeding as scheduled. The installation of such filter and heating device will not only reduce the space in the aquarium and hinder the activity of fish but also increase the expenses for installing these equipments.

The present invention is an improved design of conventional equipment so as to eliminate the inconvenience and imperfection of feeding fish at home. The object of the present invention is to offer an automatic feeding device with water-filtering and heating functions, so the problem of automatically feeding the fish with a specific quantity of feeding stuffs as scheduled can be solved, and the fish is provided with an optimum growing environment.

SUMMARY OF THE INVENTION

The present invention is mainly characterized by an automatic water flow circulation device and an automatic feeding stuffs supply device. The automatic water flow circulation device is provided with a motor-operated pump, a water-filtering trough, a water-purifying trough and a heating trough; when the water in the aquarium is pumped into the water flow circulation device, it can automatically flow into the aquarium through the filtering and heating devices so as to complete the action of water flow circulation. The automatic feeding stuffs supply device is provided with a feeding stuffs container and a seesaw device. A water collector is provided on one end of said seesaw device, and a rectangular valve plate is provided on the other end thereof; and when the weight of water in the water collector exceeds the weight of the rectangular plate, the water collector will move downward to let the water flow into the aquarium, and the rectangular valve plate will also move upward to let the feeding stuffs fall into the aquarium at the same time so as to finish the action of automatic feeding stuffs supply.

DETAILED DESCRIPTION OF THE INVENTION

Figure 1:
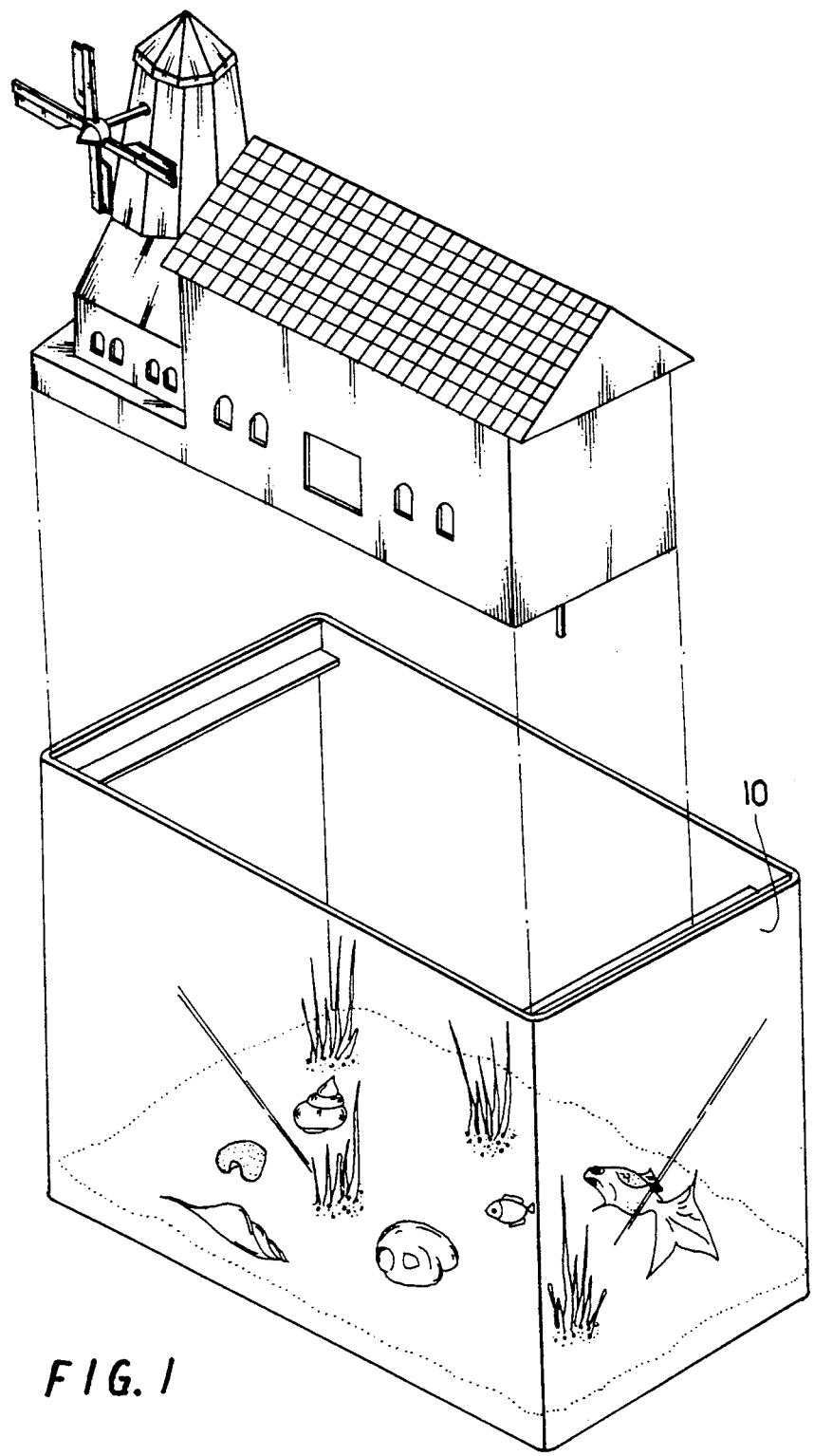
FIG. 1 is an exploded view of an aquarium equipped with an apparatus embodying the invention.

As shown in FIG. 1, the present invention may be directly installed on the aquarium(10) and ingeniously designed to present a beautiful appearance in keeping with the aquarium(10) as a decoration such as the windmill and building illustrated therein.

Figure 2:
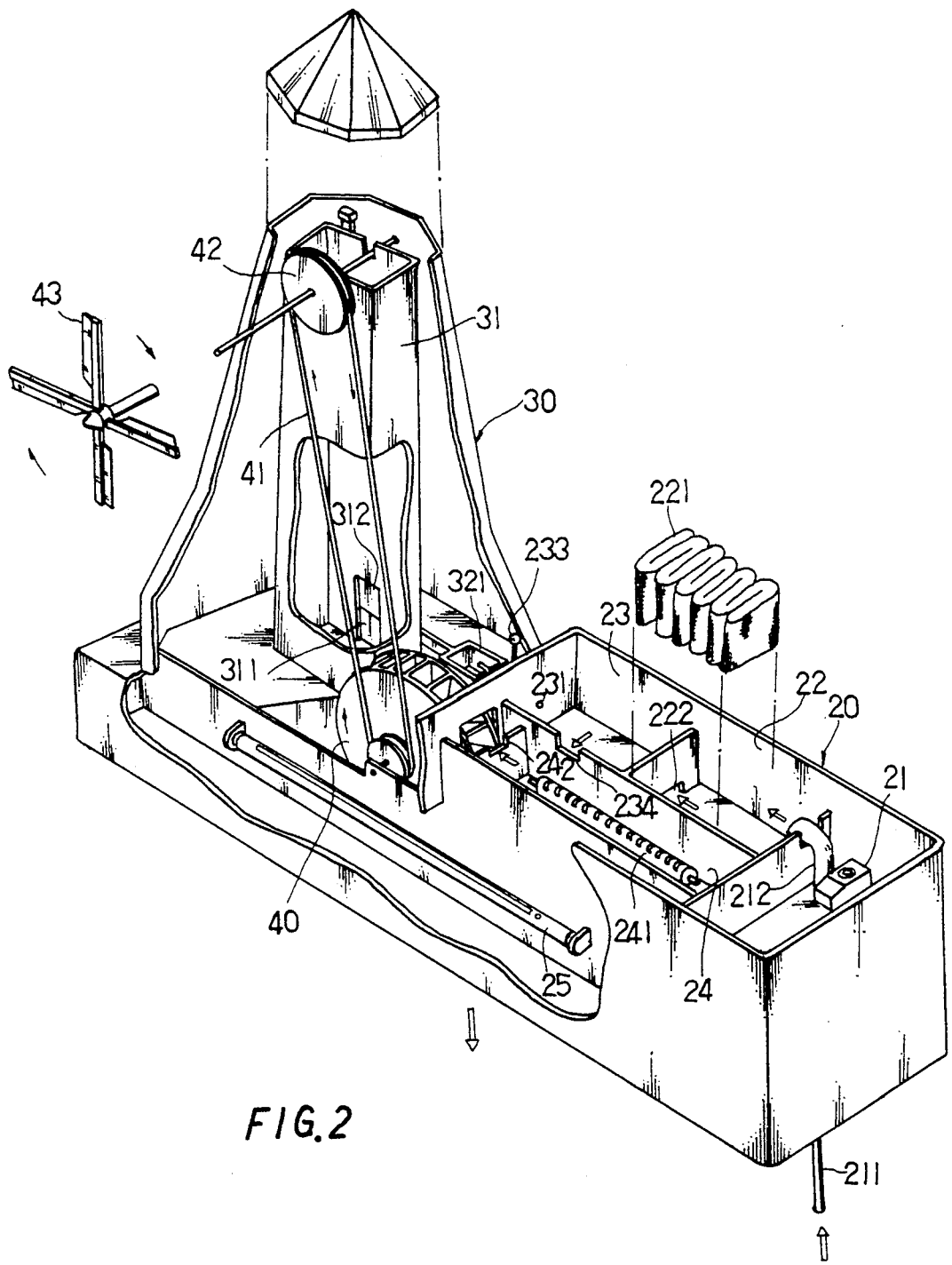
FIG. 2 is an enlarged perspective view, with parts broken away showing automatic water flow circulation device and automatic feeding stuffs supply device of the present invention.

As shown in FIG. 2, the present invention consists chiefly of two portions: an automatic water flow circulation device(2) and an automatic feeding stuffs supply device(30).

Figure 4:
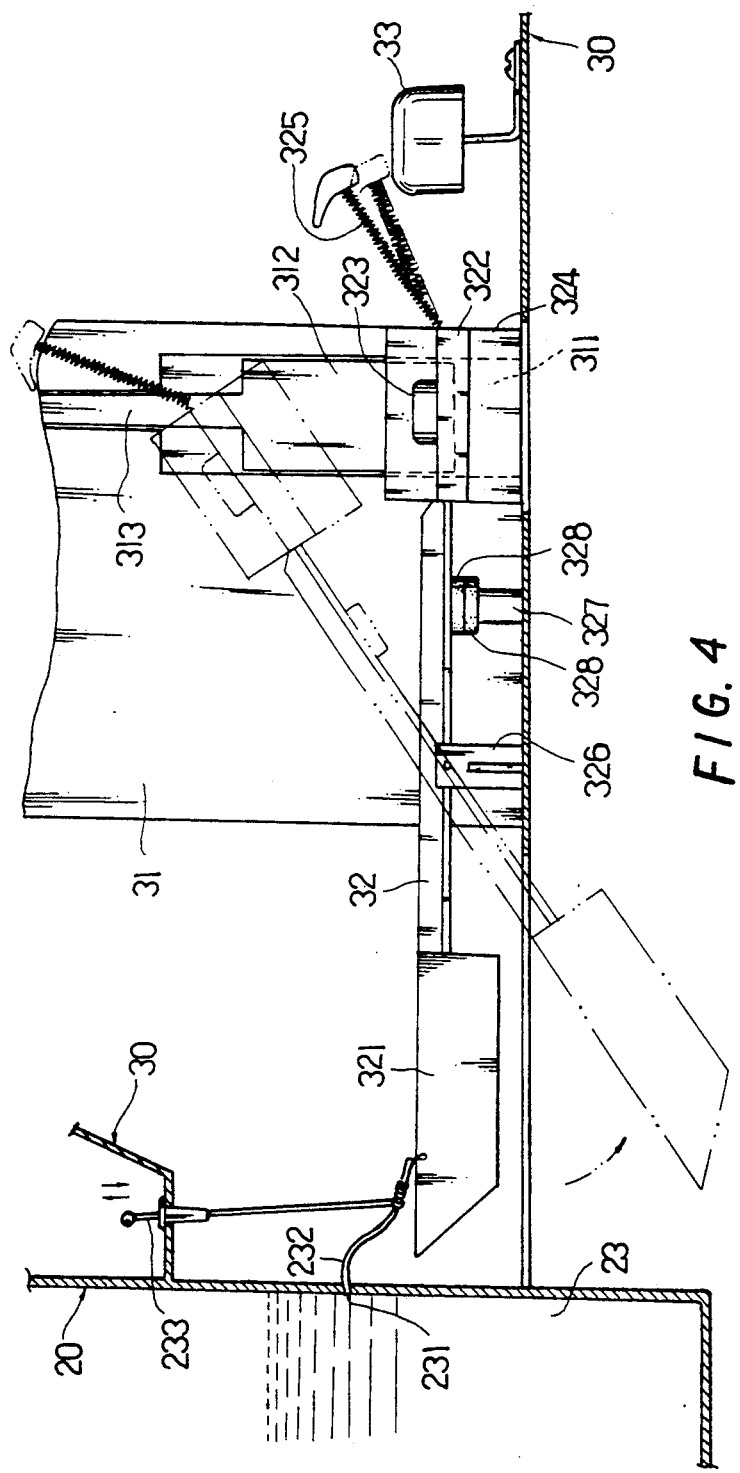
FIG. 4 is a fragmentary side elevation view illustrating the action of automatic feeding stuffs supply device shown in FIG. 3.

The automatic water flow circulation device(20) consists of a motor-operated pump(21), a water filtering trough(22), a water purifying trough(23) and a heating trough(24). A water-supply pipe(211) for pump(21) is directly extended into the aquarium(10) so that the pump is able to pump the water into the water-purifying trough(22) through a water outlet pipe(212). A cotton filter net (221) containing active carbon is disposed in the water-filtering trough(22) so as to filter miscellaneous dirty substances in the water. A water outlet hole(222) on the bottom edge of one wall of the water-filtering trough(22) lets the filtered water flow into the water-purifying trough(23). A capillary(231) is inserted in a connecting hole(231) on the wall of water-purifying trough(23) (as shown in FIG. 4) so as to let the water drop into a water collector (321) on one end of a seesaw device(32) through the capillary(232). A recess(234) on the water-purifying trough(23) lets the water in the water-purifying trough(23) flow into the heating trough(24) wherein a heating pipe(241) causes the water in the heating trough (24) to be heated to a desired temperature, and a recess(242) on the wall of heating trough(24) lets the heated water flow outside the heating trough(24) and directly onto the blades of a water mill(40) as shown in the drawing so as to actuate turning the water mill(40). Water flows from mill(40) into the aquarium(10) once again to complete the action of automatic water flow circulation. Meantime, the water mill(40) and a rotating shaft(42) actuates a belt(41) for turning the windmill blading 43 in a decorative fashion.

Figure 3:
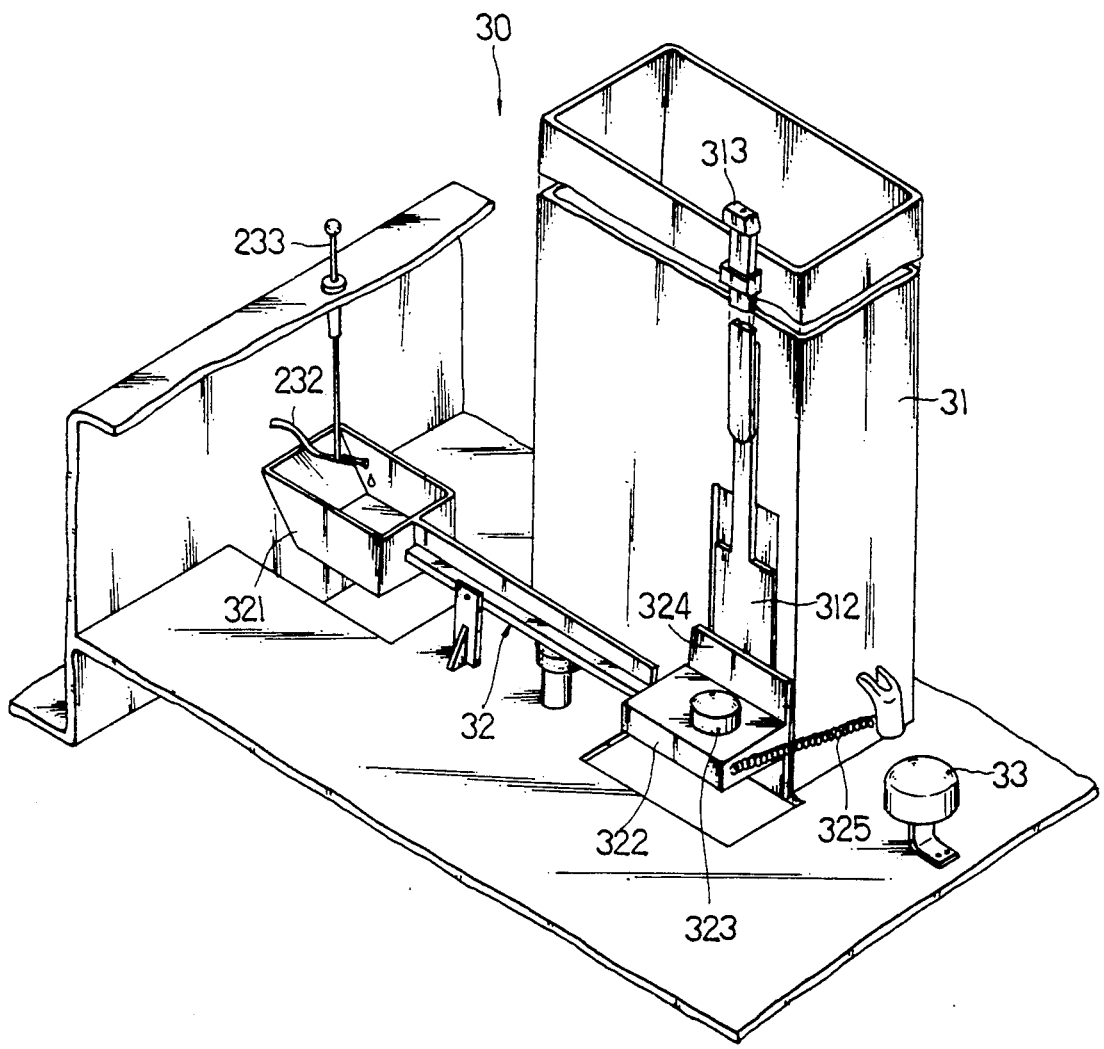
FIG. 3 is a rear perspective view of an automatic feeding stuffs supply device used in the apparatus of FIGS. 1 and 2.

Further, an illumination tube-shaped lamp(25) is mounted on the wall of the water flow circulation device(20) so as to provide an illumination for the aquarium(10):

As shown in FIGS. 2, 3 and 4, the automatic feeding stuffs supply device(30) of the present invention consists of a granular feeding stuffs container(31) for storing the feeding stuffs in quantity, a seesaw lever device(32) and a bell(33). The vertical side wall of feeding stuffs container(31) is provided with a discharge port(311) to let the feeding stuffs fall down. A gate plate(312) is slidably mounted in the discharge port(311) for adjustment up and down by a pull rod(313) so as to control the quantity of feeding stuffs falling out each time through port(311). One end of the seesaw lever device(32) is provided with a water collector(321) and another end thereof is provided with a rectangular plate(322) whereon a small lead block(323) is provided so as to increase the weight of rectangular plate(322). A vertical valve plate(324) attached to one edge of the rectangular plate(322) can stop the feeding stuffs from flowing through the discharge port(311). As shown in FIG. 4, the water in the water-purifying trough(23) will gradually drop down into the water collector(321) through the capillary(232). When the weight of water in the water collector(321) is heavier than that of both rectangular plate(322) and small lead block(323), the seesaw device(32) is in an unbalanced state, so that the water collector(321) will decline downward to let the rectangular plate (322) lift upward, such that valve plate(324) disengages from the discharge port(311), and the feeding stuffs in the feeding stuffs container(31) flow through port(311) and down into the aquarium(10) to feed the fish therein as shown by the dotted line in FIG. 4. However, when the water collector(321) declines downward to let the water in the water collector(321) drop down into the aquarium (10), the weight of water collector(321) will be lighter than that of both rectangular plate(322) and small lead block(323), so the seesaw device(32) restores its original balanced state once again. The valve plate(324) stops the feeding stuffs in the position of discharge port(311) to prevent the feeding stuffs from falling down, thereby completing the feeding cycle. The said bell(33) is designed to be struck by a spring hammer(325) on the rectangular plate(322) to generate sound which reminds the master that it is the time to feed the fish with the feeding stuffs. In addition, a support seat(327) is provided between the rectangular plate(322) and a pivot shaft seat(326); a magnet(328) is attached to the support seat(327) and to a plate carried on the seesaw device(32) so that these two magnets(328) attract each other to let the seesaw device(32) be balanced and stablized more easily and to prevent the seesaw device(32) from swinging in an uncontrolled fashion. In addition, a control rod(233) is provided above the water collector(321) and the capillary(232). The position of capillary(232) can be adjusted up and down through the action of control rod(233) stretching up and down so as to conrol the water-dropping speed of capillary(232) and to achieve the purpose of controlling the time of feeding the feeding stuffs.

Should there be a failure of the electrical power supply, the automatic water flow circulation device(2) of the present invention cannot operate normally, but the recess(234) is designed to be higher than the connecting hole(231), so the water stored in the space between the recess(234) and the connecting hole(231) is enough to supply the water for dropping down from the capillary(232) to the supply the water for dropping down from the capillary(232) to the water collector(321) of automatic feeding stuffs supply device(30).

Figure 5:
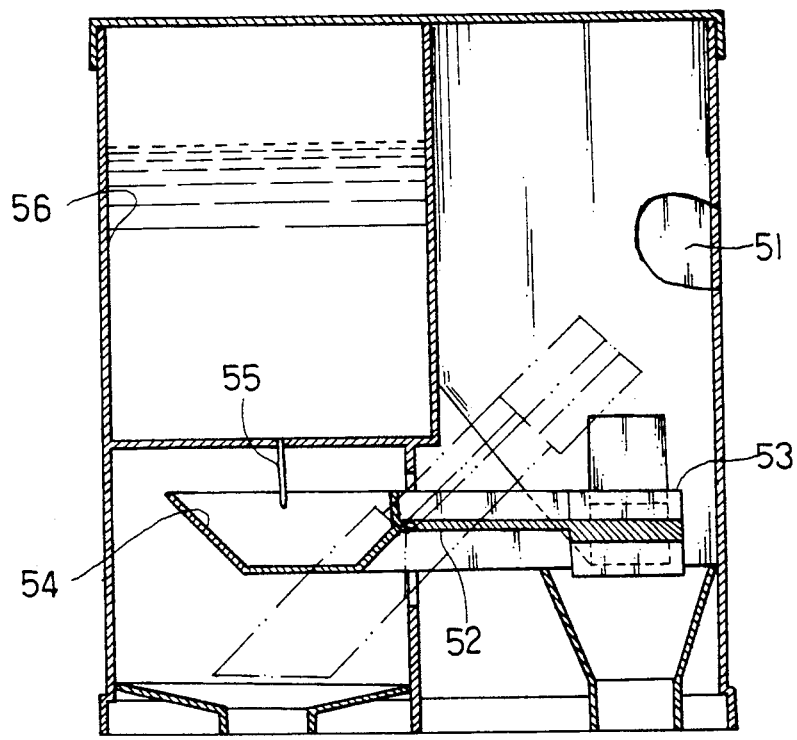
FIG. 5 is a sectional view taken through another automatic feeding stuffs supply device of the present invention applied to feeding cat or dog.

Furthermore, the automatic feeding stuffs supply device(30) of the present invention can be used to feed other animals such as cats and dogs. As shown in FIG. 5, the apparatus comprises a feeding stuffs container(51), a seesaw device(52), a rectangular vertical valve plate(53) and a water collector(54) provided inside the automatic feeding stuffs supply device for cats and dogs. The apparatus has the same operating principle and function as the said device(30). The capillary(55) extends from water container(56) so that the water can drop from the capillary(55) to the water collector(54) to achieve the action of automatic feeding stuffs supply according to the present invention.

In summary, the automatic feeding device with water-filtering and heat-reserving purposes in accordance with the present invention is novel and practical and can not only provide the homeowner with the convenience of buying all the required equipment once for all but also achieve the purpose of feeding the pet with a specific quantity of feeding stuffs as scheduled.

I claim:

1. An automatic feeding device comprising:
    an upright granular feed supply container (31) having a bottom wall and a vertical side wall, and a feed discharge port (311) in said side wall;
    a balancing lever (32) located alongside the feed supply container, horizontal axis pivot support means connected to said lever at an intermediate point therealong whereby opposite ends of the lever move in different directions during swinging movement of the lever around the pivot axis;
    an upwardly facing water collection receptacle (321) on one end of said lever; a vertically-oriented valve plate (324) on the other end of said lever, said valve plate extending vertically across said feed discharge port when said water collection receptacle is in an empty condition, whereby feed is then prevented from flowing through the port;
    and means for dripping water into the receptacle at a relatively slow rate so that when a predetermined mass of water has accumulated in the receptacle the lever will be tilted to a position wherein the receptable is lowered to a water-discharge position and the valve plate is raised to a non-blocking position permitting flow of feed through the discharge port; said vertically oriented valve plate being movable in a vertical plane so as to slice edgewise through the granular feed flowing through the discharge port.

2. The feeding device of claim 1, and further comprising magnet means for normally holding said lever in a balanced condition wherein the valve plate is in a blocking position extending across the feed discharge port; said magnet means exerting sufficient force on the lever so that the holding force on the lever drops rapidly when the lever begins to tilt from its balanced position.

* * * * *